(12) United States Patent
Moh

(10) Patent No.: US 11,396,330 B2
(45) Date of Patent: Jul. 26, 2022

(54) VEHICLE FRONT STRUCTURE

(71) Applicants: HYUNDAI MOTOR COMPANY, Seoul (KR); KIA MOTORS CORPORATION, Seoul (KR)

(72) Inventor: Kwan Ho Moh, Gunpo-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 103 days.

(21) Appl. No.: 17/073,596

(22) Filed: Oct. 19, 2020

(65) Prior Publication Data

US 2021/0403094 A1 Dec. 30, 2021

(30) Foreign Application Priority Data

Jun. 24, 2020 (KR) .................. 10-2020-0077345

(51) Int. Cl.
*B60J 7/00* (2006.01)
*B62D 25/08* (2006.01)
*B62D 21/15* (2006.01)
*B60R 19/18* (2006.01)
*B60R 19/24* (2006.01)

(52) U.S. Cl.
CPC .............. *B62D 25/08* (2013.01); *B60R 19/18* (2013.01); *B60R 19/24* (2013.01); *B62D 21/155* (2013.01); *B60R 2019/1806* (2013.01)

(58) Field of Classification Search
CPC ....... H01L 2924/00; H01L 2924/00014; H01L 2224/48091; H04W 24/10; A61K 2039/5156; A61K 2300/00; A47B 2023/045; A47B 23/042; B42F 13/402; E05Y 2900/20
See application file for complete search history.

(56) References Cited

U.S. PATENT DOCUMENTS

| 9,545,950 | B2* | 1/2017 | Lee ...................... B62D 21/152 |
| 2015/0115633 | A1* | 4/2015 | Braunbeck .............. B60R 19/24 |
| | | | 293/132 |
| 2015/0314811 | A1* | 11/2015 | Shibata ................ B62D 25/082 |
| | | | 296/193.09 |
| 2017/0253272 | A1* | 9/2017 | Sekiya .................. B62D 25/085 |
| 2019/0023324 | A1* | 1/2019 | Sekiya ................... B62D 21/15 |

FOREIGN PATENT DOCUMENTS

| JP | 2005-271811 A | 10/2005 |
| JP | 2008-195204 A | 8/2008 |
| JP | 2018-184089 A | 11/2018 |
| KR | 10-0258620 B1 | 8/2000 |

\* cited by examiner

*Primary Examiner* — Kiran B Patel
(74) *Attorney, Agent, or Firm* — Lempia Summerfield Katz LLC

(57) ABSTRACT

A vehicle front structure includes: a front side member disposed on a front of a vehicle; a bumper beam mounting bracket joined to a front end surface of the front side member; a subframe mounting bracket joined to a rear surface of the bumper beam mounting bracket, and having a seating surface to which a front end of a front subframe is joined; a heat exchanger support joined to the bumper beam mounting bracket; and a first reinforcing member joining the bumper beam mounting bracket and the heat exchanger support.

11 Claims, 4 Drawing Sheets

VEHICLE FRONT STRUCTURE

CROSS-REFERENCE TO RELATED APPLICATION

This application claims priority to and the benefit of Korean Patent Application No. 10-2020-0077345, filed on Jun. 24, 2020, the entire contents of which are incorporated herein by reference.

FIELD

The present disclosure relates to a vehicle front structure, and more particularly, to a vehicle front structure capable of improving noise-vibration-harshness (NVH) and crash performance by ensuring stiffness at mounting points and acoustic sensitivity.

BACKGROUND

The statements in this section merely provide background information related to the present disclosure and may not constitute prior art.

In general, a vehicle body includes a main frame and a subframe. The subframe is made up of a front subframe connected to a front lower end of the vehicle body and a rear subframe connected to a rear lower end of the vehicle body.

The front subframe may support an engine, a transmission, a suspension, etc. The front subframe may serve to facilitate load transfer while providing structural stiffness of the vehicle. In particular, it is easy to sufficiently ensure the basic performance of the vehicle, such as crashworthiness, NVH, and R&H, only when the front subframe is firmly mounted on the vehicle body.

Meanwhile, the front subframe may be disposed under front side members forming a framework of the vehicle body. In particular, a front end of the front subframe may be mounted to a front end of the front side member through a subframe mounting bracket. The subframe mounting bracket may be joined to the front of the front side member by welding, using fasteners, and/or the like, so that the subframe mounting bracket may absorb impact energy in the initial stage of a frontal collision/impact, thereby improving the crash performance (crashworthiness).

The front end of the front subframe may be joined to a bottom end of the subframe mounting bracket, and the bottom end of the subframe mounting bracket may be joined to a front mounting point of the front subframe. In particular, the bottom end of the subframe mounting bracket and the front mounting point of the front subframe may be offset from a longitudinal axis of the front side member in downward and outward directions. We have discovered that when an external load is transferred to the subframe mounting bracket, it is very difficult to suppress the subframe mounting bracket from vibrating in a longitudinal and/or width direction of the vehicle since the bottom end of the subframe mounting bracket is offset from the front side member. This may result in reduced acoustic sensitivity and stiffness at the mounting point with respect to the bottom end of the subframe mounting bracket and the front mounting point of the front subframe.

That is, it is very difficult for a conventional vehicle front structure to ensure stiffness at the mounting point and acoustic sensitivity, which are very important in NVH performance, because the bottom end of the subframe mounting bracket and the front mounting point of the front subframe are offset from the front side member.

The above information described in this background section is provided to assist in understanding the background of the inventive concept, and may include any technical concept which is not considered as the prior art that is already known to those skilled in the art.

SUMMARY

The present disclosure has been made to solve the above-mentioned problems occurring in the prior art while advantages achieved by the prior art are maintained intact.

An aspect of the present disclosure provides a vehicle front structure capable of improving noise-vibration-harshness (NVH) and crash performance by ensuring stiffness at mounting points and acoustic sensitivity.

According to an aspect of the present disclosure, a vehicle front structure may include: a front side member disposed on a front of a vehicle; a bumper beam mounting bracket joined to a front end surface of the front side member; a subframe mounting bracket joined to a rear surface of the bumper beam mounting bracket, and having a seating surface to which a front end of a front subframe is joined; a heat exchanger support joined to the bumper beam mounting bracket; and a first reinforcing member configured to connect the bumper beam mounting bracket to the heat exchanger support.

In one form, the heat exchanger support may include: an upper member, a lower member vertically and downwardly spaced apart from the upper member, and two side members disposed on both sides of the upper member and the lower member, and the first reinforcing member may connect a front surface of the bumper beam mounting bracket to the side member of the heat exchanger support.

The bumper beam mounting bracket may have a mounting flange joined to the heat exchanger support.

The first reinforcing member may extend obliquely from a front surface of the bumper beam mounting bracket.

The first reinforcing member may have a first mounting flange joined to a front surface of the bumper beam mounting bracket, and a second mounting flange joined to the heat exchanger support.

The bumper beam mounting bracket may have a lower extension portion joined to a bottom end of the first reinforcing member and a bottom end of the heat exchanger support.

The vehicle front structure may further include a second reinforcing member configured to connect the subframe mounting bracket to the front side member.

The second reinforcing member may extend obliquely between the subframe mounting bracket and the front side member.

The subframe mounting bracket may have a first mounting flange joined to the rear surface of the bumper beam mounting bracket, and a second mounting flange joined to the front side member.

The subframe mounting bracket may have an inboard side surface facing an interior of the vehicle and an outboard side surface facing an exterior of the vehicle, a tapered surface may be provided on the inboard side surface of the subframe mounting bracket, and the tapered surface may extend obliquely toward the exterior of the vehicle.

The first reinforcing member may be made of a material having a tensile strength lower than or equal to a tensile strength of the subframe mounting bracket.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
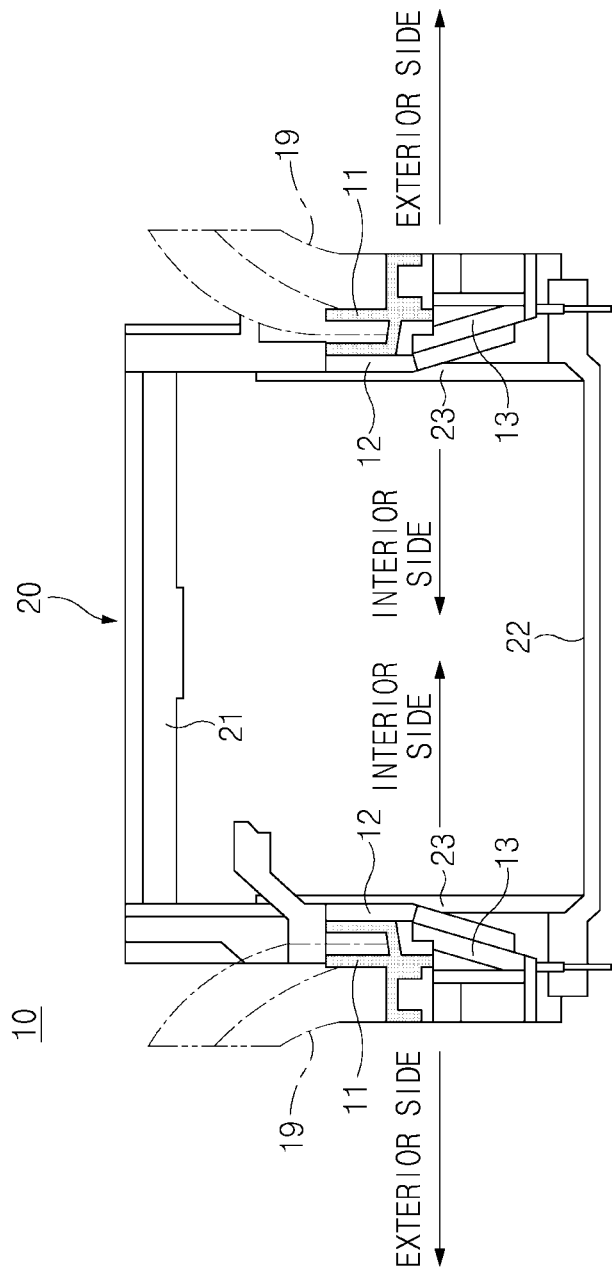
FIG. 1 illustrates a rear view of a portion of a vehicle front structure according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary forms of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
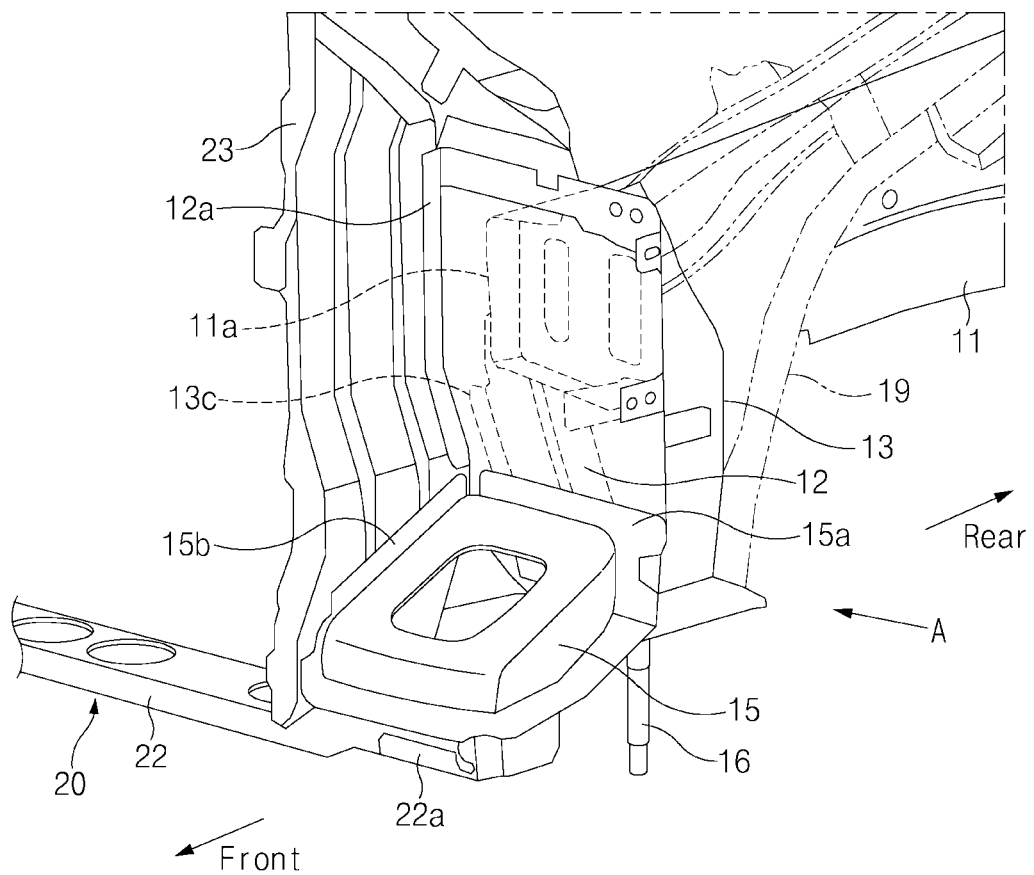
FIG. 2 illustrates a perspective view of a left portion of a vehicle front structure according to an exemplary form of the present disclosure when viewed from the front of the vehicle.

Referring to FIGS. 1 and 2, a vehicle front structure 10 according to an exemplary form of the present disclosure may include: a front side member 11 disposed on the front of the vehicle, a bumper beam mounting bracket 12 joined to a front end surface 11a of the front side member 11, a subframe mounting bracket 13 joined to the bumper beam mounting bracket 12, and a heat exchanger support 20 joined to the bumper beam mounting bracket 12.

Figure 3:
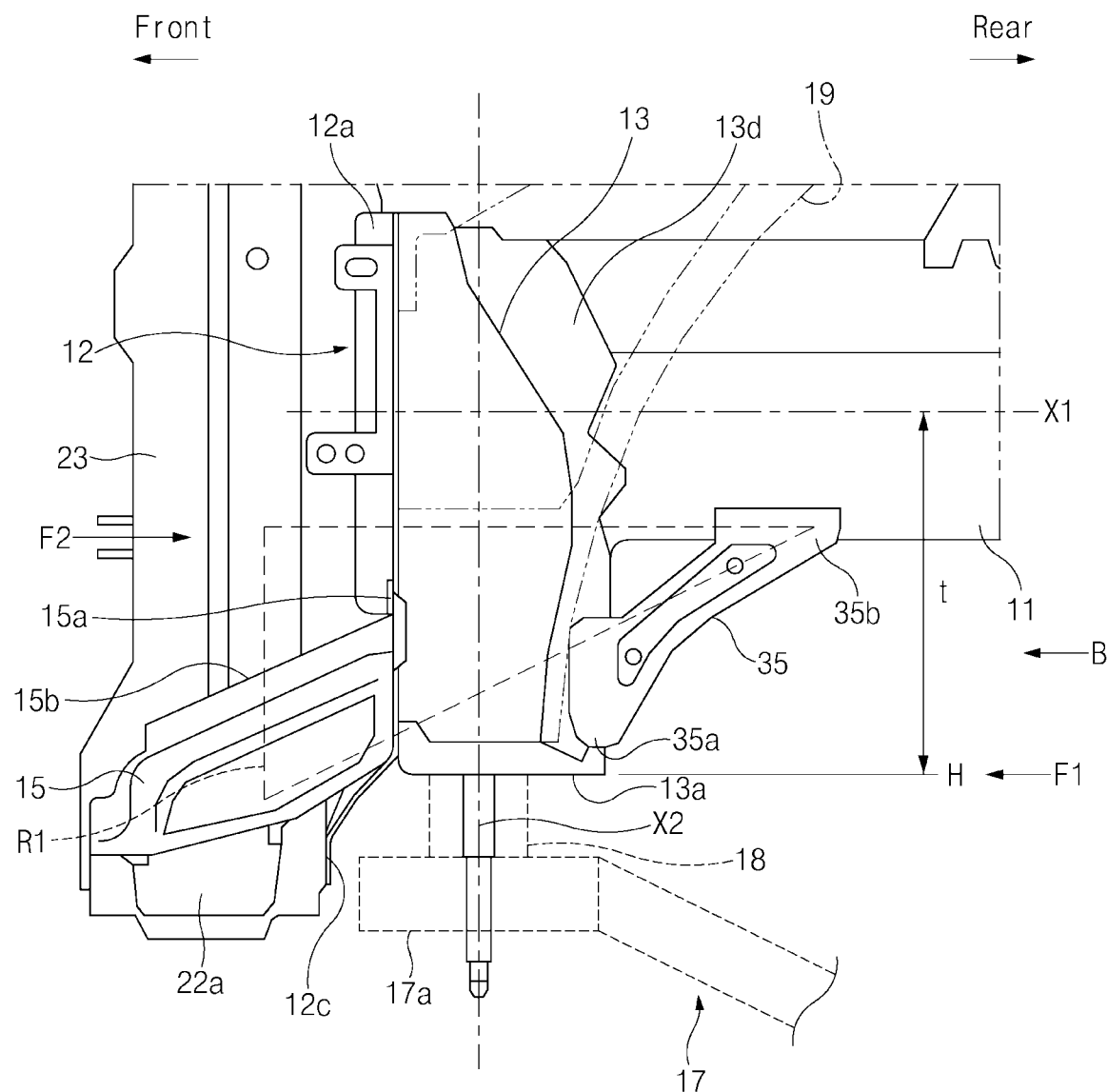
FIG. 3 illustrates a view which is viewed from a direction indicated by arrow A of FIG. 2.

A longitudinal axis X1 of the front side member 11 may extend in a longitudinal direction of the vehicle (see FIG. 3).

As illustrated in FIG. 1, the pair of front side members 11 may be spaced apart from each other in a width direction of the vehicle.

A rear surface of the bumper beam mounting bracket 12 and the front end surface 11a of the front side member 11 may be joined by welding, using fasteners, and/or the like. The bumper beam mounting bracket 12 may be a plate of which a height is greater than a width, and the bumper beam mounting bracket 12 may extend in a height direction of the vehicle. As illustrated in FIG. 1, the pair of bumper beam mounting brackets 12 may be spaced apart from each other in the width direction of the vehicle, and a bumper beam may be mounted on the pair of bumper beam mounting brackets 12. The pair of bumper beam mounting brackets 12 may be connected to both sides of the heat exchanger support 20, respectively.

Figure 4:
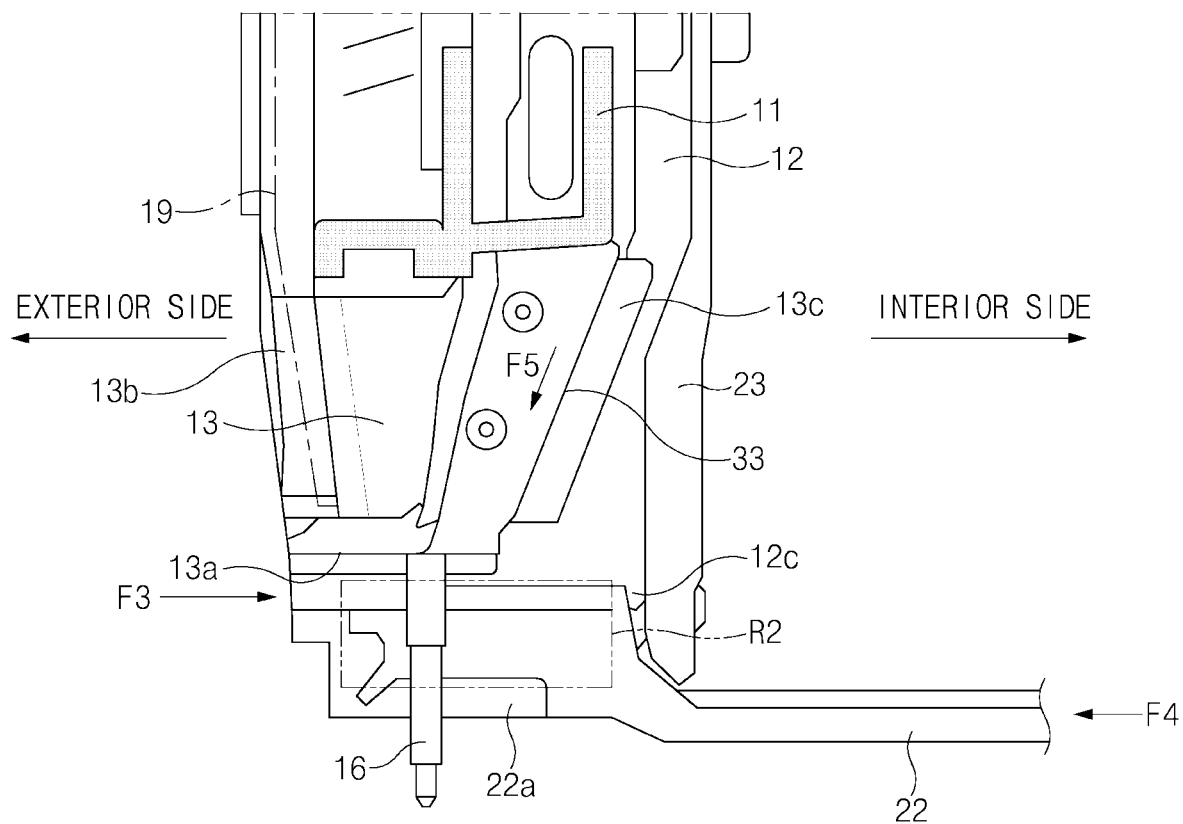
FIG. 4 illustrates a view which is viewed from a direction indicated by arrow B of FIG. 3.

The subframe mounting bracket 13 and the rear surface of the bumper beam mounting bracket 12 may be joined by welding, using fasteners, and/or the like. Referring to FIGS. 2 to 4, the subframe mounting bracket 13 may be joined to the rear surface of the bumper beam mounting bracket 12 while not interfering with the front end surface 11a of the front side member 11. That is, the subframe mounting bracket 13 may be joined to the front end surface 11a of the front side member 11 and the rear surface of the bumper beam mounting bracket 12.

Referring to FIGS. 2 to 4, a connecting member 19 may be a fender apron member having an upper portion connected to a fender apron, and a lower portion attached to an outboard side surface of the subframe mounting bracket 13 and the rear surface of the bumper beam mounting bracket 12.

As illustrated in FIG. 1, the pair of bumper beam mounting brackets 12 may be spaced apart from each other in the width direction of the vehicle, and the bumper beam may be mounted on the pair of bumper beam mounting brackets 12. The pair of bumper beam mounting brackets 12 may be connected to both sides of the heat exchanger support 20, respectively.

A longitudinal axis X2 of the subframe mounting bracket 13 may extend in the height direction of the vehicle (see FIG. 3). Thus, the longitudinal axis X2 of the subframe mounting bracket 13 may be perpendicular to the longitudinal axis X1 of the front side member 11.

Referring to FIGS. 3 and 4, the subframe mounting bracket 13 may have a seating surface 13a formed on a bottom end thereof, and a mounting rod 16 may be fixed to the seating surface 13a to form a unitary one piece. The seating surface 13a may be flat in a horizontal direction, and a virtual line H extending horizontally from the seating surface 13a may be offset from the longitudinal axis X1 of the front side member 11 by a predetermined gap t. A front end 17a of a front subframe 17 may be joined to the mounting rod 16 of the subframe mounting bracket 13. A damping member 18 such as a rubber bush may be interposed between the seating surface 13a of the subframe mounting bracket 13 and the front end 17a of the front subframe 17. Thus, the seating surface 13a and the mounting rod 16 of the subframe mounting bracket 13 may be joined to a front mounting point of the front subframe 17.

Referring to FIGS. 2 to 4, the subframe mounting bracket 13 may have first mounting flanges 13b and 13c extending along front edges thereof, and a second mounting flange 13d provided on a rear end thereof. Referring to FIG. 4, the first mounting flanges 13b and 13c may extend both edges of the subframe mounting bracket 13, and the first mounting flanges 13b and 13c and the rear surface of the bumper beam mounting bracket 12 may be joined by welding, using fasteners, and/or the like. Referring to FIG. 3, an upper portion of the second mounting flange 13d may be joined to a side surface of the front side member 11 by welding, using fasteners, and/or the like.

The subframe mounting bracket 13 may have an inboard side surface facing the interior of the vehicle and an outboard side surface facing the exterior of the vehicle. The subframe mounting bracket 13 may have a tapered surface 33 formed on the inboard side surface thereof, and the tapered surface 33 may extend obliquely downward from the interior of the vehicle toward the exterior of the vehicle. A top end of the tapered surface 33 may be closer to the interior of the vehicle than a bottom end of the tapered surface 33, and the bottom end of the tapered surface 33 may be closer to the exterior of the vehicle than the top end of the tapered surface 33. The subframe mounting bracket 13 may reduce or minimize a deformation in a left-right direction due to the tapered surface 33.

A front compartment, in which a prime mover such as an internal combustion engine and an electric motor and parts related to the prime mover are received, may be located on the front of the vehicle, and the heat exchanger support 20 may be located between the front of the front compartment and a front grille of the vehicle. The heat exchanger support 20 may support a heat exchanger with a radiator and a condenser located between the front of the front compartment and the front grille of the vehicle.

Referring to FIG. 1, the heat exchanger support 20 may be a rectangular frame structure including an upper member 21, a lower member 22 vertically and downwardly spaced apart from the upper member 21, and two side members 23 disposed on both sides of the upper member 21 and the lower member 22. A top end of the heat exchanger may be connected to the upper member 21 so that the upper member 21 may support the top end of the heat exchanger, and a bottom end of the heat exchanger may be connected to the lower member 22 so that the lower member 22 may support the bottom end of the heat exchanger. The two side members 23 may support both sides of the heat exchanger, respectively.

The bumper beam mounting bracket 12 may have a plane perpendicular to the side member 23 of the heat exchanger support 20. A front surface of the bumper beam mounting bracket 12 may face the front of the vehicle, and the rear surface of the bumper beam mounting bracket 12 may face the rear of the vehicle. The bumper beam mounting bracket 12 may have a mounting flange 12a formed on an inboard side edge thereof. The mounting flange 12a of the bumper beam mounting bracket 12 and the side member 23 of the heat exchanger support 20 may be joined by welding, using fasteners, and/or the like.

The vehicle front structure 10 according to an exemplary form of the present disclosure may include a first reinforcing member 15 and a second reinforcing member 35 to increase an energy absorption rate in the event of a vehicle collision/impact.

The first reinforcing member 15 may join the front surface of the bumper beam mounting bracket 12 and the side member 23 of the heat exchanger support 20 by welding, using fasteners, and/or the like. The first reinforcing member 15 may have a first mounting flange 15a and a second mounting flange 15b. The first mounting flange 15a and the front surface of the bumper beam mounting bracket 12 may be joined by welding, using fasteners, and/or the like. As the first reinforcing member 15 is joined to the front surface of the bumper beam mounting bracket 12 through the first mounting flange 15a, a load in a frontal collision/impact of the vehicle may be transferred to the subframe mounting bracket 13 through the first reinforcing member 15, and thus the crash performance (crashworthiness) may be improved. The second mounting flange 15b and the side member 23 of the heat exchanger support 20 may be joined by welding, using fasteners, and/or the like. Thus, the first reinforcing member 15 may join the bumper beam mounting bracket 12 and the side member 23 of the heat exchanger support 20.

According to an exemplary form, the first reinforcing member 15 may extend obliquely upward from the front of the vehicle toward the rear of the vehicle. As the first reinforcing member 15 is obliquely connected to the front surface of the bumper beam mounting bracket 12, the first reinforcing member 15 may define an inclined load path.

According to an exemplary form, the first mounting flange 15a and the second mounting flange 15b of the first reinforcing member 15 may be welded to the bumper beam mounting bracket 12 and the side member 23. As the first reinforcing member 15 is joined to the bumper beam mounting bracket 12 and the side member 23 by welding rather than mechanical coupling such as bolting or riveting, the number of parts required for assembly may be reduced, and accordingly manufacturing cost may be reduced.

The second reinforcing member 35 may join the subframe mounting bracket 13 and the front side member 11 by welding, using fasteners, and/or the like. A first end portion 35a of the second reinforcing member 35 may be joined to a lower portion of the second mounting flange 13d of the subframe mounting bracket 13 by welding, using fasteners, and/or the like, and a second end portion 35b of the second reinforcing member 35 may be joined to the front side member 11 by welding, using fasteners, and/or the like. The second reinforcing member 35 may extend obliquely between the subframe mounting bracket 13 and the front side member 11 which are perpendicular to each other, thereby defining an inclined load path.

Referring to FIG. 3, the first end portion 35a of the second reinforcing member 35 may be joined to the lower portion of the second mounting flange 13d of the subframe mounting bracket 13. As the subframe mounting bracket 13 has the second mounting flange 13d providing a joint area of the first end portion 35a of the second reinforcing member 35, the mounting of the second reinforcing member 35 may be made easy and simple.

According to an exemplary form, the first end portion 35a and the second end portion 35b of the second reinforcing member 35 may be welded to the second mounting flange 13d of the subframe mounting bracket 13 and the front side member 11. As the second reinforcing member 35 is joined to the subframe mounting bracket 13 and the front side member 11 by welding rather than mechanical coupling such as bolting or riveting, the number of parts required for assembly may be reduced, and accordingly manufacturing cost may be reduced.

The first end portion 35a of the second reinforcing member 35 may be joined to the bottom end of the subframe mounting bracket 13 adjacent to the seating surface 13a, and the second end portion 35b of the second reinforcing member 35 may be joined to a portion of the front side member 11 adjacent to the front end surface 11a. Thus, the second reinforcing member 35 may transfer a load applied to the subframe mounting bracket 13 to the front side member 11 very effectively. An inclination angle of the second reinforcing member 35 may be the same as or similar to that of the first reinforcing member 15, and accordingly the load path defined by the first reinforcing member 15 may be connected to the load path defined by the second reinforcing member 35. Thus, the load may be transferred to the front side member 11 through the first reinforcing member 15 and the second reinforcing member 35 very effectively.

Meanwhile, when a tensile strength of the first reinforcing member 15 and a tensile strength of the second reinforcing member 35 are greater than a tensile strength of the subframe mounting bracket 13, the strength reinforcement of the first reinforcing member 15 and the second reinforcing member 35 may be excessive, which may reduce the energy absorption rate in the event of a vehicle collision/impact. According to an exemplary form, the first reinforcing member 15 and the second reinforcing member 35 may be made of a material having a tensile strength lower than or equal to the tensile strength of the subframe mounting bracket 13. As the tensile strength of the first reinforcing member 15 and the tensile strength of the second reinforcing member 35 are lower than or equal to the tensile strength of the subframe mounting bracket 13, the first reinforcing member 15 and the second reinforcing member 35 may improve the energy absorption rate in the event of a vehicle collision/impact. As a load in a frontal collision/impact of the vehicle is transferred to the front side member 11 along the load path defined by the first reinforcing member 15 and the load path defined by the second reinforcing member 35, it may induce a deformation of the front end 17a of the front subframe 17, and thus the impact energy absorption rate during the frontal collision/impact of the vehicle may be increased, and restraint energy (RTE) may be improved by approximately 10% or more.

Referring to FIG. 3, the first reinforcing member 15 may be obliquely connected to the bumper beam mounting bracket 12, and the second reinforcing member 35 may be obliquely connected to the subframe mounting bracket 13 and the front side member 11, so that the first reinforcing member 15, the bumper beam mounting bracket 12, the subframe mounting bracket 13, and the second reinforcing member 35 may be connected to the front side member 11. This may allow the first reinforcing member 15, the bumper beam mounting bracket 12, the subframe mounting bracket 13, and the second reinforcing member 35 to form a first reinforcement region "R1" in FIG. 3. In one form, as the first reinforcing member 15 and the second reinforcing member 35 are inclined, the first reinforcement region R1 may be triangular. When a load F1 applied in the longitudinal direction of the vehicle is transferred to the seating surface 13a of the subframe mounting bracket 13, a reaction force F2 responding thereto may be created through the first reinforcement region R1, and thus stiffness of the vehicle front structure 10 may be improved in the longitudinal direction thereof.

Referring to FIG. 3, the bumper beam mounting bracket 12 may have a lower extension portion 12c, and the lower extension portion 12c may be bent toward an end portion 22a of the lower member 22 of the heat exchanger support 20.

Referring to FIGS. 3 and 4, a bottom end of the first reinforcing member 15 and the end portion 22a of the lower member 22 of the heat exchanger support 20 may be joined to the lower extension portion 12c of the bumper beam mounting bracket 12 by welding, using fasteners, and/or the like. The second mounting flange 15b of the first reinforcing member 15 and the side member 23 of the heat exchanger support 20 may be joined, and the end portion 22a of the lower member 22 of the heat exchanger support 20 and the lower extension portion 12c of the bumper beam mounting bracket 12 may be joined, thereby allowing the first reinforcing member 15, the side member 23 of the heat exchanger support 20, the lower extension portion 12c of the bumper beam mounting bracket 12, and the end portion 22a of the lower member 22 of the heat exchanger support 20 to form a second reinforcement region R2. When a load F3 applied in the width direction of the vehicle is transferred to the seating surface 13a of the subframe mounting bracket 13, reaction forces F4 and F5 responding thereto may be created through the second reinforcement region R2. In particular, the horizontal reaction force F4 may be transferred through the lower member 22 of the heat exchanger support 20, and the inclined reaction force F5 may be transferred through the tapered surface 33 of the subframe mounting bracket 13.

As set forth above, according to exemplary forms of the present disclosure, the first reinforcing member may be obliquely connected to the bumper beam mounting bracket, and the second reinforcing member may be obliquely connected to the subframe mounting bracket and the front side member, so that the first reinforcing member, the bumper beam mounting bracket, the subframe mounting bracket, and the second reinforcing member may be connected to the front side member. This may allow the first reinforcing member, the bumper beam mounting bracket, the subframe mounting bracket, and the second reinforcing member to form the first reinforcement region. In particular, as the first reinforcing member and the second reinforcing member are inclined, the first reinforcement region may be triangular. When a load applied in the longitudinal direction of the vehicle is transferred to the seating surface of the subframe mounting bracket, a reaction force responding thereto may be created through the first reinforcement region, and thus the stiffness of the vehicle front structure may be improved in the longitudinal direction thereof.

According to exemplary forms of the present disclosure, the second mounting flange of the first reinforcing member may be joined to the side member of the heat exchanger support, and the bottom end of the first reinforcing member and the end portion of the lower member of the heat exchanger support may be joined to the lower extension portion of the bumper beam mounting bracket. This may allow the first reinforcing member, the side member of the heat exchanger support, the lower extension portion of the bumper beam mounting bracket, and the end portion of the lower member of the heat exchanger support to form the second reinforcement region. When a load applied in the width direction of the vehicle is transferred to the seating surface of the subframe mounting bracket, reaction forces responding thereto may be created through the second reinforcement region. In particular, the horizontal reaction force may be transferred through the lower member of the heat exchanger support, and the inclined reaction force may be transferred through the tapered surface of the subframe mounting bracket.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:
1. A vehicle front structure, comprising:
a front side member disposed on a front of a vehicle;
a bumper beam mounting bracket joined to a front end surface of the front side member;

a subframe mounting bracket joined to a rear surface of the bumper beam mounting bracket, and having a seating surface to which a front end of a front subframe is joined;

a heat exchanger support joined to the bumper beam mounting bracket; and a first reinforcing member configured to connect the bumper beam mounting bracket to the heat exchanger support.

2. The vehicle front structure according to claim 1, wherein the heat exchanger support includes: an upper member, a lower member vertically and downwardly spaced apart from the upper member, and two side members disposed on both sides of the upper member and the lower member, and the first reinforcing member is configured to connect a front surface of the bumper beam mounting bracket to the side member of the heat exchanger support.

3. The vehicle front structure according to claim 1, wherein the bumper beam mounting bracket has a mounting flange joined to the heat exchanger support.

4. The vehicle front structure according to claim 1, wherein the first reinforcing member is configured to extend obliquely from a front surface of the bumper beam mounting bracket.

5. The vehicle front structure according to claim 1, wherein the first reinforcing member has a first mounting flange joined to a front surface of the bumper beam mounting bracket, and a second mounting flange joined to the heat exchanger support.

6. The vehicle front structure according to claim 1, wherein the bumper beam mounting bracket has a lower extension portion joined to a bottom end of the first reinforcing member and a bottom end of the heat exchanger support.

7. The vehicle front structure according to claim 1, further comprising: a second reinforcing member configured to connect the subframe mounting bracket to the front side member.

8. The vehicle front structure according to claim 7, wherein the second reinforcing member is configured to extend obliquely between the subframe mounting bracket and the front side member.

9. The vehicle front structure according to claim 1, wherein the subframe mounting bracket has a first mounting flange joined to the rear surface of the bumper beam mounting bracket, and a second mounting flange joined to the front side member.

10. The vehicle front structure according to claim 1, wherein:

the subframe mounting bracket has an inboard side surface facing an interior of the vehicle and an outboard side surface facing an exterior of the vehicle, a tapered surface is provided on the inboard side surface of the subframe mounting bracket, and the tapered surface is configured to extend obliquely toward the exterior of the vehicle.

11. The vehicle front structure according to claim 1, wherein the first reinforcing member is made of a material having a tensile strength lower than or equal to a tensile strength of the subframe mounting bracket.

* * * * *